(12) United States Patent
Ashton et al.

(10) Patent No.: US 8,446,631 B2
(45) Date of Patent: May 21, 2013

(54) SYSTEMS AND METHODS FOR EFFICIENTLY PRINTING POSTER DOCUMENTS

(75) Inventors: Anthony A. Ashton, Vancouver, WA (US); James E. Owen, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1213 days.

(21) Appl. No.: 11/105,097

(22) Filed: Apr. 13, 2005

(65) Prior Publication Data

US 2006/0232807 A1 Oct. 19, 2006

(51) Int. Cl.
*G06K 15/00* (2006.01)

(52) U.S. Cl.
USPC .............. 358/1.2; 358/1.1; 358/452; 382/286

(58) Field of Classification Search
USPC .............. 358/1.1, 1.2, 1, 2, 452; 382/286
See application file for complete search history.

(56) References Cited

U.S. PATENT DOCUMENTS

| 5,987,270 | A * | 11/1999 | Hulan et al. ................. 399/45 |
| 6,961,135 | B1 * | 11/2005 | Nakagiri et al. ............. 358/1.1 |
| 6,967,740 | B1 * | 11/2005 | Leng et al. .................. 358/1.18 |
| 7,777,901 | B2 * | 8/2010 | Sano ............................ 358/1.14 |
| 2002/0026379 | A1 * | 2/2002 | Chiarabini et al. ............. 705/26 |
| 2002/0054343 | A1 * | 5/2002 | Nagata ......................... 358/1.15 |
| 2003/0053083 | A1 | 3/2003 | Nishikawa et al. |
| 2003/0202211 | A1 | 10/2003 | Yudasaka et al. |
| 2004/0119990 | A1 * | 6/2004 | Miller et al. ................... 358/1.2 |
| 2004/0177336 | A1 | 9/2004 | Kujirai et al. |
| 2005/0162670 | A1 * | 7/2005 | Shuler ........................... 358/1.2 |

FOREIGN PATENT DOCUMENTS

| JP | 2001109600 | 4/2001 |
| JP | 2003-216403 | 7/2003 |
| JP | 2004021456 | 1/2004 |

* cited by examiner

*Primary Examiner* — King Poon
*Assistant Examiner* — Lawrence Wills
(74) *Attorney, Agent, or Firm* — Austin Rapp & Hardman

(57) ABSTRACT

In an exemplary method, a driver for a printing device receives a print job comprising a poster document. The print job is designated to be printed on a printing device. The driver identifies the size of the paper for which the poster document is initially formatted. The driver determines whether the target printing device is capable of printing on larger paper. If the target printing device is capable of printing on larger paper, the driver reformats the poster document for printing on the larger paper.

22 Claims, 12 Drawing Sheets

SYSTEMS AND METHODS FOR EFFICIENTLY PRINTING POSTER DOCUMENTS

TECHNICAL FIELD

The present invention relates generally to printing use of a computer. More specifically, the present invention relates to systems and methods for efficiently printing poster documents.

BACKGROUND

Computer technologies continue to advance at a rapid pace. Indeed, computers are used in almost all aspects of business, industry and academic endeavors. Improvements in computer technologies have been a force for bringing about great increases in business and industrial productivity. More and more homes are using computers as well.

There are many different kinds of computers in use today. The term "computer system" will be used herein to refer generally to any device (or combination of devices) that is capable of processing information to produce a desired result. Some examples of computer systems include personal computers, hand-held computers, personal digital assistants (PDAs), servers, mainframes, supercomputers, minicomputers, workstations, microcomputers, microcontrollers, and the like.

Application software is designed to use the capabilities of a computer system to help a user to perform various tasks. A piece of application software is sometimes referred to simply as an application. Examples of applications that are commonly used include word processors, Web browsers, database tools, graphics programs, and the like. Applications may be used to create electronic documents. Some examples of electronic documents include word-processed materials (e.g., letters, reports, etc.), spreadsheets, graphics, etc. Electronic documents are sometimes referred to simply as documents.

Sometimes it is desirable to produce a hard copy of an electronic document. A printing device may be used to perform this task. The term "printing device," as used herein, refers to any device that produces human-readable text and/or graphics on an output medium, such as paper. Some examples of printing devices include computer printers, fax machines, scanners, multi-function peripherals, copiers, and so forth. To facilitate printing of an electronic document, a computer system may be connected to (i.e., placed in electronic communication with) a printing device.

One type of document that may be printed is a poster document. As used herein, the term "poster document" refers to any document wherein the dimensions of a logical page of the document are greater than the dimensions of the physical pages on which the document is printed. Thus, a single, logical page of a poster document occupies more than one physical page when it is printed. The multiple physical pages may be pieced together to produce a printed representation of the logical page.

A computer system may include one or more printing device drivers. The driver for a particular printing device facilitates communication between applications on the computer system and the printing device. More specifically, the driver allows applications to be able to print documents on the printing device without knowing specific details about the printing device's hardware and internal language.

Benefits may be realized by improved systems and methods related to the use of computer systems to print documents on printing devices. More specifically, benefits may be realized by systems and methods for efficiently printing poster documents.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
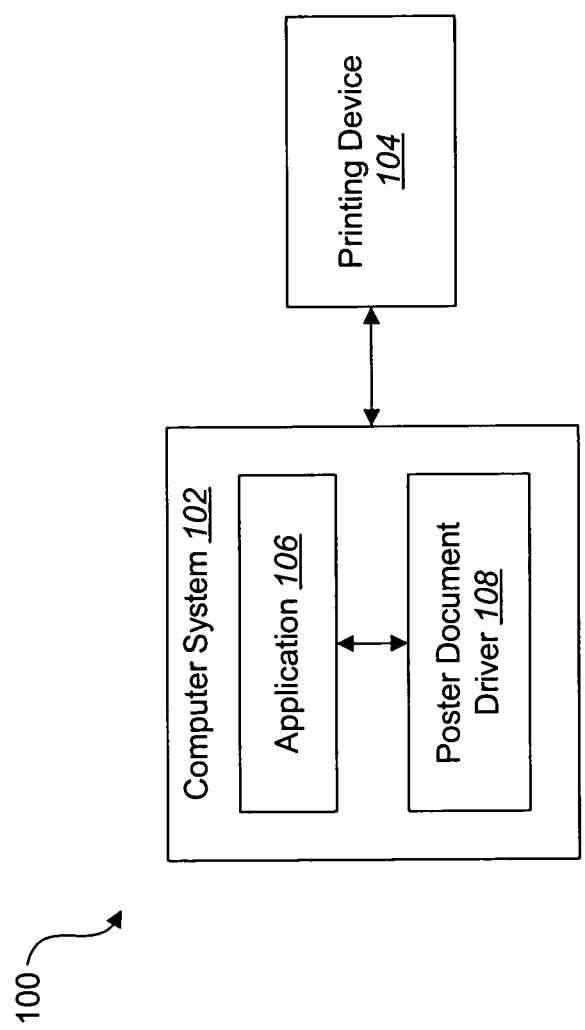
FIG. 1 illustrates an exemplary system in which some embodiments may be practiced, the system including a poster document driver.

A method for minimizing how many physical pages are used to print a poster document is disclosed. A driver for a printing device receives a print job comprising a document. The document is designated for printing on a printing device. Some examples of printing devices that may be used include printers, fax machines, scanners, multi-function peripherals, copiers, and so forth. The driver also receives a request to print the document as a poster document.

The driver identifies an initial paper size for which the document is initially formatted. The driver also determines whether a target printing device is capable of printing on a larger paper size. In some embodiments, the driver automatically identifies the initial paper size and determines whether the target printing device is capable of printing on the larger paper size in response to receiving the print job. In some embodiments, the driver determines whether the target printing device is capable of printing on the larger paper size by querying the target printing device. If the target printing device is not capable of printing on the larger paper size, the driver formats the poster document for printing on the initial paper size.

If the target printing device is capable of printing on the larger paper size, the driver may also determine whether a user wants to print the poster document on the larger paper size. In some embodiments, the driver determines whether the user wants to print the poster document on the larger paper size by displaying a user interface object. Alternatively, the driver may determine whether the user wants to print the poster document on the larger paper size by querying a predefined setting. If the user wants to print the poster document on the larger paper size, the driver formats the poster document for printing on the larger paper size.

In some embodiments, the driver formats the poster document for printing on the larger paper size by receiving instructions for the print job and writing the instructions to a journal file. For each physical page that is used to print the poster document, the driver reads the instructions that correspond to a current physical page from the journal file, renders the instructions, and applies an offset and scale when rendering the instructions.

Alternatively, the driver may format the poster document for printing on the larger paper size by receiving instructions for the print job, converting the instructions into page description language commands, and writing the page description language commands to an output file. For each physical page that is used to print the poster document, the driver reads the page description language commands that correspond to a current physical page from the output file, and applies an offset and scale to the page description language commands.

Alternatively, the driver may format the poster document for printing on the larger paper size by having a print processor play back an enhanced metafile file for each physical page that is used to print the poster document. The driver renders instructions from the enhanced metafile file that correspond to a current physical page. The driver applies an offset and scale when rendering the instructions.

A computer system that is configured to implement a method for minimizing how many physical pages are used to print a poster document is also disclosed. The computer system includes a processor, and memory in electronic communication with the processor. Instructions are stored in the memory. The instructions are executable to implement a method that involves a driver receiving a print job comprising a document, and receiving a request to print the document as a poster document. The driver identifies an initial paper size for which the document is initially formatted. The driver also determines whether a target printing device is capable of printing on a larger paper size. If the target printing device is capable of printing on the larger paper size, the driver formats the poster document for printing on the larger paper size.

A computer-readable medium comprising executable instructions for implementing a method for minimizing how many physical pages are used to print a poster document is also disclosed. The method involves a driver receiving a print job comprising a document, and receiving a request to print the document as a poster document. The driver identifies an initial paper size for which the document is initially formatted. The driver also determines whether a target printing device is capable of printing on a larger paper size. If the target printing device is capable of printing on the larger paper size, the driver formats the poster document for printing on the larger paper size.

A method for enlarging a single-page document to a poster document is also disclosed. The method involves a driver receiving a print job comprising a single-page document. The driver also receives instructions from a user to enlarge the single-page document to a poster document. The driver presents to the user an option to print the poster document on paper that is non-symmetrical relative to the single-page document. If the user selects the option, the driver enlarges the single-page document for printing on the non-symmetrical paper.

A method for allowing a user to manually manipulate characteristics of a poster document before printing is also disclosed. The method involves a driver receiving a print job comprising a document. The driver also receives a request to print the document as a poster document. The driver displays a user interface window, and provides a preview area within the user interface window. The preview area shows how the poster document will appear when printed. The driver also provides at least one size adjustment control within the user interface window. The at least one size adjustment control allows the user to resize the poster document. The driver may receive user instructions to resize the poster document via the at least one size adjustment control. The driver also provides at least one paper size control within the user interface window. The at least one paper size control allows the user to change a paper size for which the poster document is formatted for printing. The driver may receive user instructions to change the paper size via the at least one paper size control.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary system 100 in which some embodiments may be practiced. A computer system 102 is in electronic communication with a printing device 104. The computer system 102 includes an application 106 and a driver 108 for the printing device 104.

The driver 108 in the system 100 of FIG. 1 is configured to facilitate the efficient printing of poster documents. As indicated above, the term "poster document" refers to any document wherein the dimensions of a logical page of the document are greater than the dimensions of the physical pages on which the document is printed. Thus, a single, logical page of a poster document occupies more than one physical page when it is printed. The multiple physical pages may be pieced together to produce a printed representation of the logical page. The driver 108 is configured to perform various tasks that assist a user of the computer system 102 to efficiently print poster documents. The driver 108 may sometimes be referred to herein as a poster document driver 108.

In some embodiments, the poster document driver 108 may be configured to automatically minimize the number of physical pages that are used to print a poster document. This may reduce the amount of work that is involved to piece together the multiple physical pages of the poster document, and also may reduce the number of seams (i.e., places where two separate physical pages are joined) in the poster document. Some exemplary methods that may be performed by the driver 108 to implement this functionality will be described below.

Figure 2:
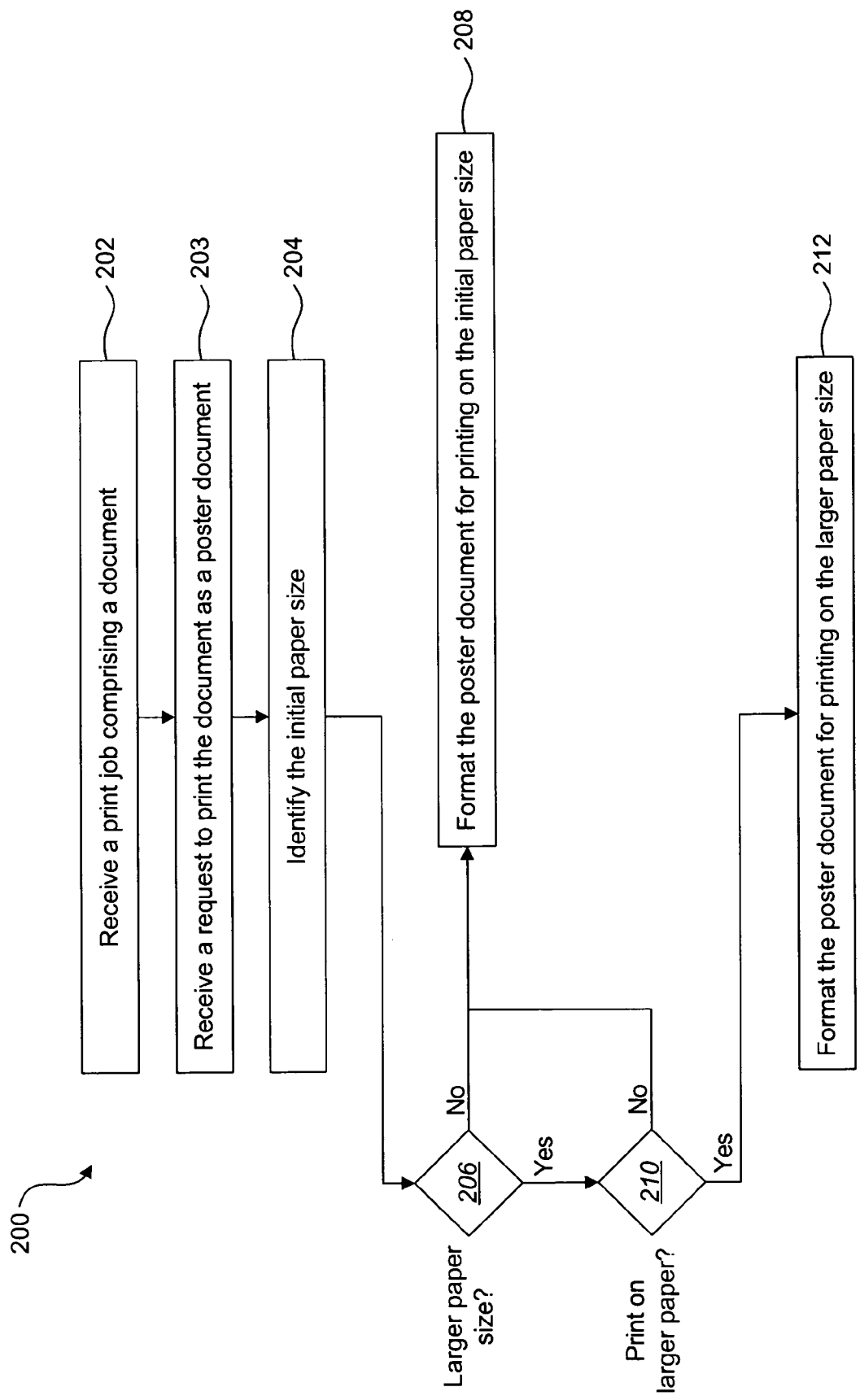
FIG. 2 illustrates a method that may be performed by a poster document driver in order to automatically minimize the number of physical pages that are used to print a poster document.

FIG. 2 illustrates a method 200 that may be performed by a poster document driver 108 in order to automatically minimize the number of physical pages that are used to print a poster document. The method 200 may be performed in response to a user of the computer system 102 initiating printing of a document, and the driver 108 being selected to facilitate printing of the document. The driver 108 may be selected by the user. Alternatively, the driver 108 may be selected by the computer system 102 (e.g., as a default driver).

The driver 108 receives 202 a print job comprising the document. The print job may be received from the application 106. The print job is designated to be printed on the printing device 104, which may be referred to herein as the target printing device 104.

The driver 108 receives 203 a request to print the document as a poster document. In some embodiments, the driver 108 displays a dialog box to the user which allows the user to select an option to print the document as a poster document.

The document is initially formatted for printing on a certain size of paper, such as letter (8½"×11"), legal (8½"×14"), ledger (11"×17"), etc. The paper size for which the document is initially formatted may be referred to herein as the initial paper size. The driver 108 identifies 204 the initial paper size.

The driver 108 determines 206 whether the target printing device 104 is capable of printing on paper that is larger than the initial paper size. In some embodiments this step 206 may be performed by querying the target printing device 104. If the target printing device 104 is not capable of printing on a larger paper size, the driver 108 formats 208 the poster document for printing on the initial paper size.

If the driver 108 determines 206 that the printing device 104 is capable of printing on a larger paper size, the driver 108 determines 210 whether the user wants to print the poster document on the larger paper size. In some embodiments, this step 210 may be performed by displaying a user interface (UI) object, such as a window, dialog box, etc. The UI object may inform the user that it is possible to print on the larger paper size, and allow the user to choose whether to print on the larger paper size or not.

In alternative embodiments, instead of displaying a user interface object, the driver 108 may query a predefined setting to determine whether to print on the larger paper size. This predefined setting may be a user set variable that stores the user's preference for reformatting poster documents. The value of such a variable may be set by the user via, for example, a check box on a user interface object. Alternatively, the predefined setting may be a hidden variable that is only queried one time, a non-changeable user variable, etc.

If in step 210 the user does not want to print the poster document on the larger paper size, the driver 108 formats 208 the poster document for printing on the initial paper size. However, if the user does want to print the poster document on the larger paper size, then the driver 108 formats 212 the poster document for printing on the larger paper size. Some exemplary ways that the driver 108 may format 212 the poster document for printing on the larger paper size will be discussed below.

In some embodiments, at least some of the steps of the method 200 are performed automatically. For example, in response to receiving 202 the print job and receiving 203 a request to print the document as a poster document, the driver 108 may automatically identify 204 the initial paper size and determine 206 whether the target printing device 104 is capable of printing on a larger paper size. In other words, the driver 108 may perform these steps without being prompted to do so by the user.

Figure 3A:
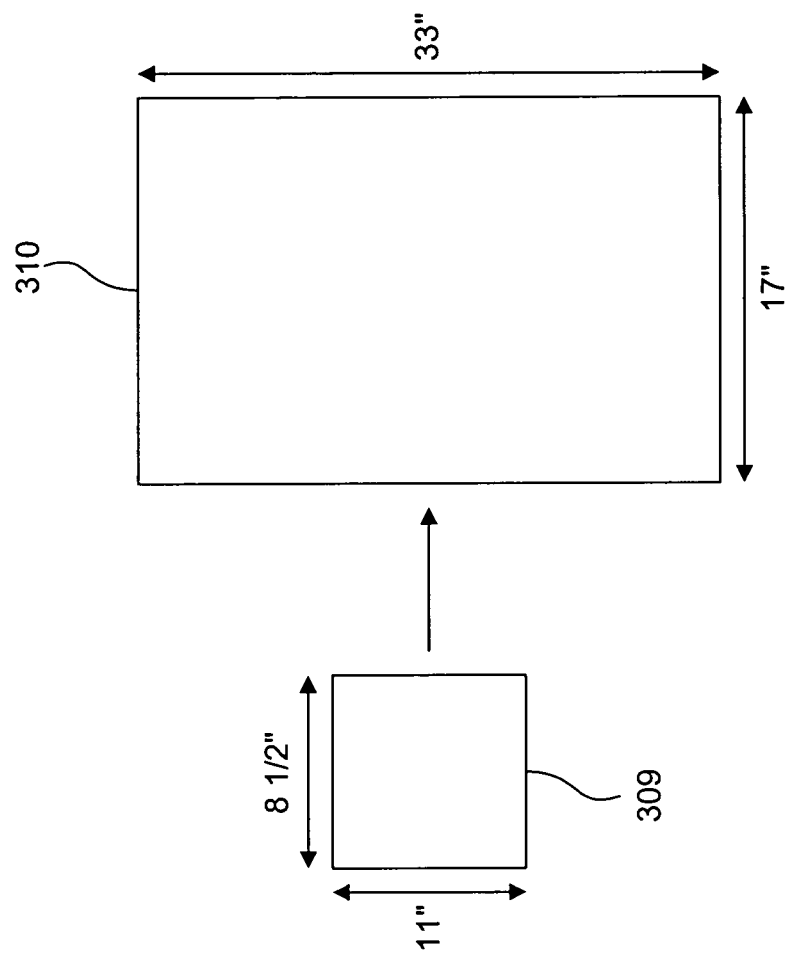
FIGS. 3A, 3B, and 3C illustrate an example showing how the number of physical pages that are used to print a poster document may be minimized.
Figure 3C:
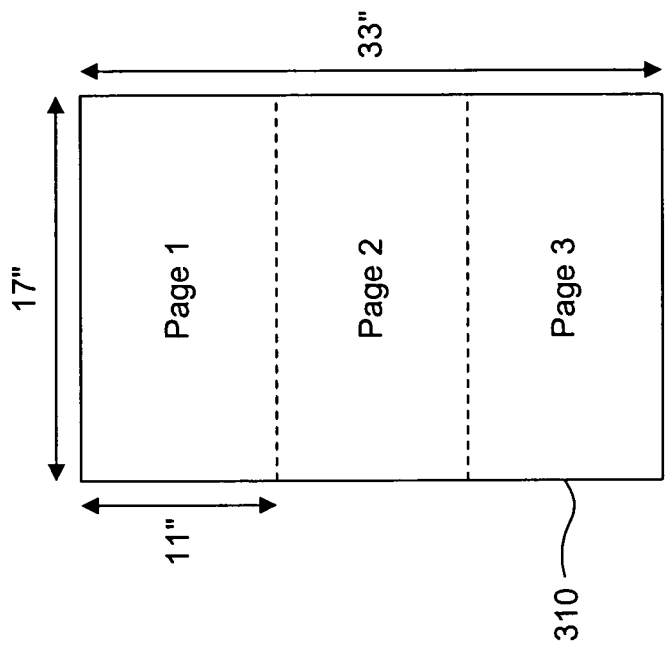
Figure 3B:
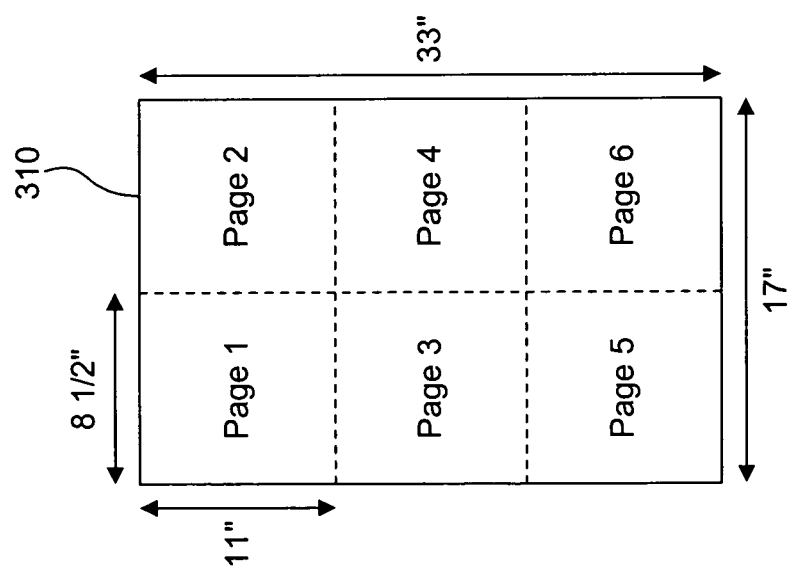

FIG. 3A through 3C illustrate an example which demonstrates how the method 200 described above may minimize the number of physical pages that are used to print a poster document. As shown in FIG. 3A, a user of the application 106 initiates printing of a single-page document 309 on a target printing device. The application 106 initially formats the document for printing on letter-sized (8½"×11") paper, and sends a print job comprising the document 309 to the driver 108. The driver 108 allows the user to select an option to print the document 309 as a poster document 310. In this example, the user selects a poster document 310 which has the dimensions of 17"×33".

As indicated above, the document 309 is initially formatted to be printed on letter-sized paper. If the driver were to format the poster document 310 for printing on letter-sized paper, six physical pages would be used to print the poster document 310. This is shown in FIG. 3B.

In the illustrated example, the target printing device 104 is capable of printing on a larger paper size, namely ledger-sized (11"×17") paper. Thus, the number of physical pages that are used to print the poster document 310 may be reduced. More specifically, the driver 108 may format the poster document 310 to be printed on ledger-sized paper instead of letter-sized paper. If this occurs, the poster document 310 may be printed on just three physical pages, as shown in FIG. 3C.

Figure 4:
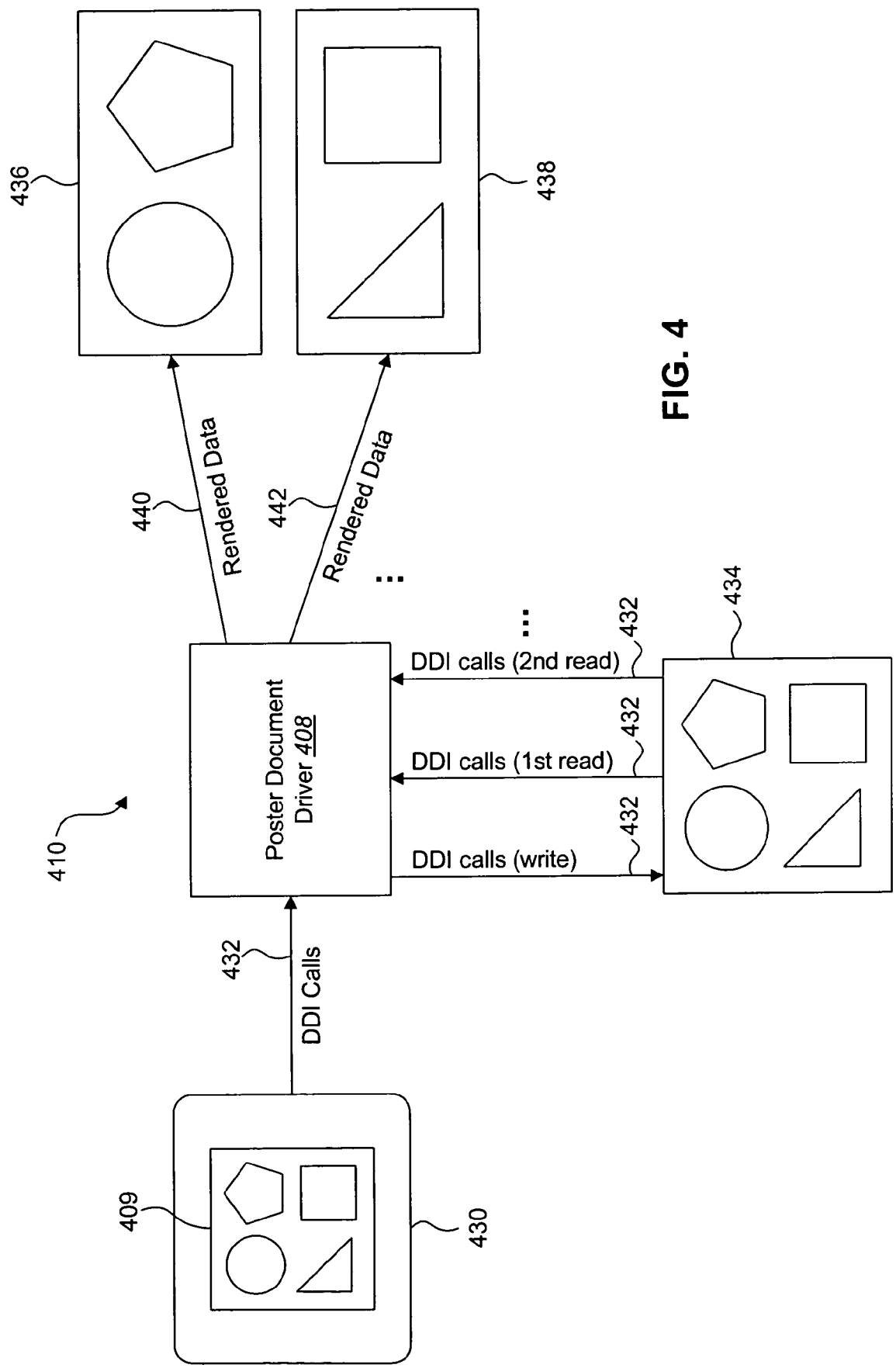
FIG. 4 illustrates an exemplary way that a poster document driver may format a poster document for printing on a larger paper size.

FIG. 4 illustrates additional details about the operation of the poster document driver 408 in some embodiments. More specifically, FIG. 4 illustrates an exemplary way that the poster document driver 408 may format a poster document for printing on a larger paper size.

A document 409 generated by a user is shown as it may appear on a computer monitor 430. The driver 408 receives instructions for a print job that comprises the document 409. The printing instructions may be device driver interface ("DDI") calls 432, as shown. The driver 408 writes the DDI calls 432 to a journal file 434. For each physical page that is used to print the resulting poster document 410, the DDI calls 432 that correspond to the current physical page are read from the journal file 434, and the driver 408 applies an appropriate offset and scale when rendering the DDI calls 432 so that the current physical page prints correctly.

More specifically, to effect printing of the first physical page 436 of the poster document 410, the driver 408 reads the journal file 434 for the first time. The driver 408 renders the journaled DDI calls 432 that correspond to the first physical page 436 of the poster document 410, applying an appropriate offset and scale so that the content corresponding to the first physical page 436 of the poster document 410 prints correctly. The driver 408 ignores the DDI calls 432 corresponding to other physical pages of the poster document 410. The first set of rendered data 440 is sent to the printing device (not shown), where it is used to print the first physical page 436 of the poster document 410.

If the poster document 410 will occupy more than one physical page when printed on the larger paper size, the driver 408 effects printing of the second physical page 438 by reading the journal file 434 for the second time. The driver 408 renders the journaled DDI calls 432 that correspond to the second physical page 438 of the poster document 410, applying an appropriate offset and scale so that the content corresponding to the second physical page 438 of the poster document 410 prints correctly. The driver 408 ignores the content corresponding to other physical pages of the poster document 410. The second set of rendered data 442 is sent to the printing device (not shown), where it is used to print the second physical page 438 of the poster document 410. If the poster document 410 occupies more than two physical pages when printed, then the method described above in connection with the first and second physical pages 436, 438 may be repeated for each additional physical page.

Figure 5:
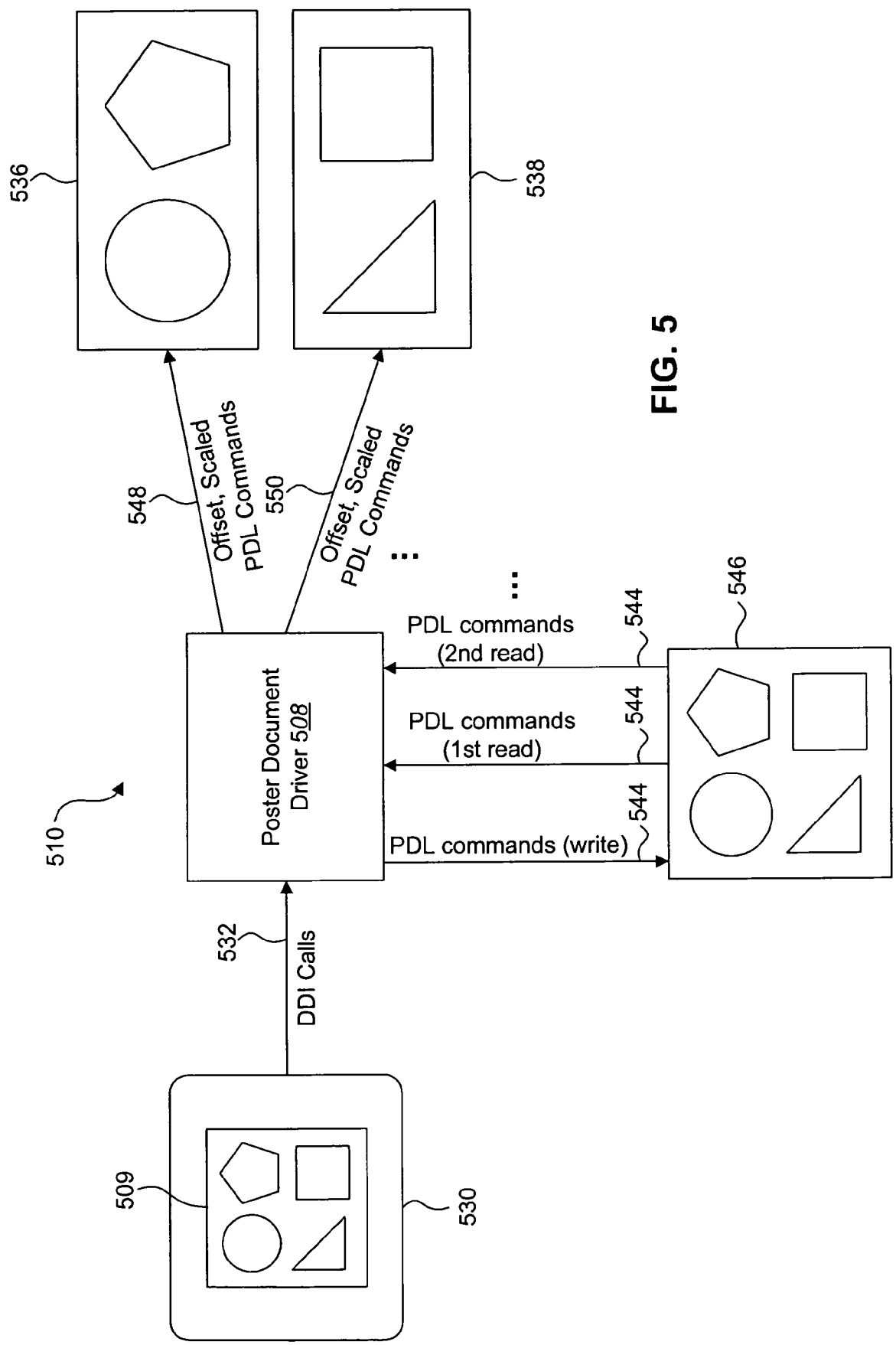
FIG. 5 illustrates another exemplary way that a poster document driver may format a poster document for printing on a larger paper size.

FIG. 5 illustrates another exemplary way that a poster document driver 508 may format a poster document 510 for printing on a larger paper size. As before, a document 509 generated by a user is shown as it may appear on a computer monitor 530. The driver 508 receives instructions for a print job that comprises the document 509. The printing instructions are DDI calls 532. In the illustrated embodiment, the driver 508 converts the DDI calls 532 into page description language (PDL) commands 544, and writes the PDL commands 544 to a PDL output file 546. For each physical page that is used to print the resulting poster document 510, the PDL commands 544 that correspond to the current physical page are read from the journal file 546, and the driver 508 applies an appropriate offset and scale to the PDL commands 544 so that the current physical page prints correctly.

More specifically, to effect printing of the first physical page 536 of the poster document 510, the driver 508 reads the PDL output file 546 for the first time. The driver 508 reads the PDL commands 544 that correspond to the first physical page 536 of the poster document 510, applying an appropriate offset and scale so that the content corresponding to the first physical page 536 of the poster document 510 prints correctly. The driver 508 ignores the PDL commands 544 corresponding to other physical pages of the poster document 510. The first set of offset, scaled PDL commands 548 is sent to the printing device (not shown) and used to print the first physical page 536 of the poster document 510.

If the poster document 510 will occupy more than one physical page when printed on the larger paper size, the driver 508 effects printing of the second physical page 538 by reading the PDL output file 546 for the second time. The driver 508 reads the PDL commands 544 that correspond to the second physical page 538 of the poster document 510, applying an appropriate offset and scale so that the content corresponding to the second physical page 538 of the poster document 510 prints correctly. The driver 508 ignores the PDL commands 544 corresponding to other physical pages of the poster document. The second set of offset, scaled PDL commands 550 is sent to the printing device (not shown) and used to print the second physical page 538 of the poster document 510. If the poster document 510 occupies more than two physical pages when printed, then the method described above in connection with the first and second physical pages 536, 538 may be repeated for each additional physical page.

Figure 6:
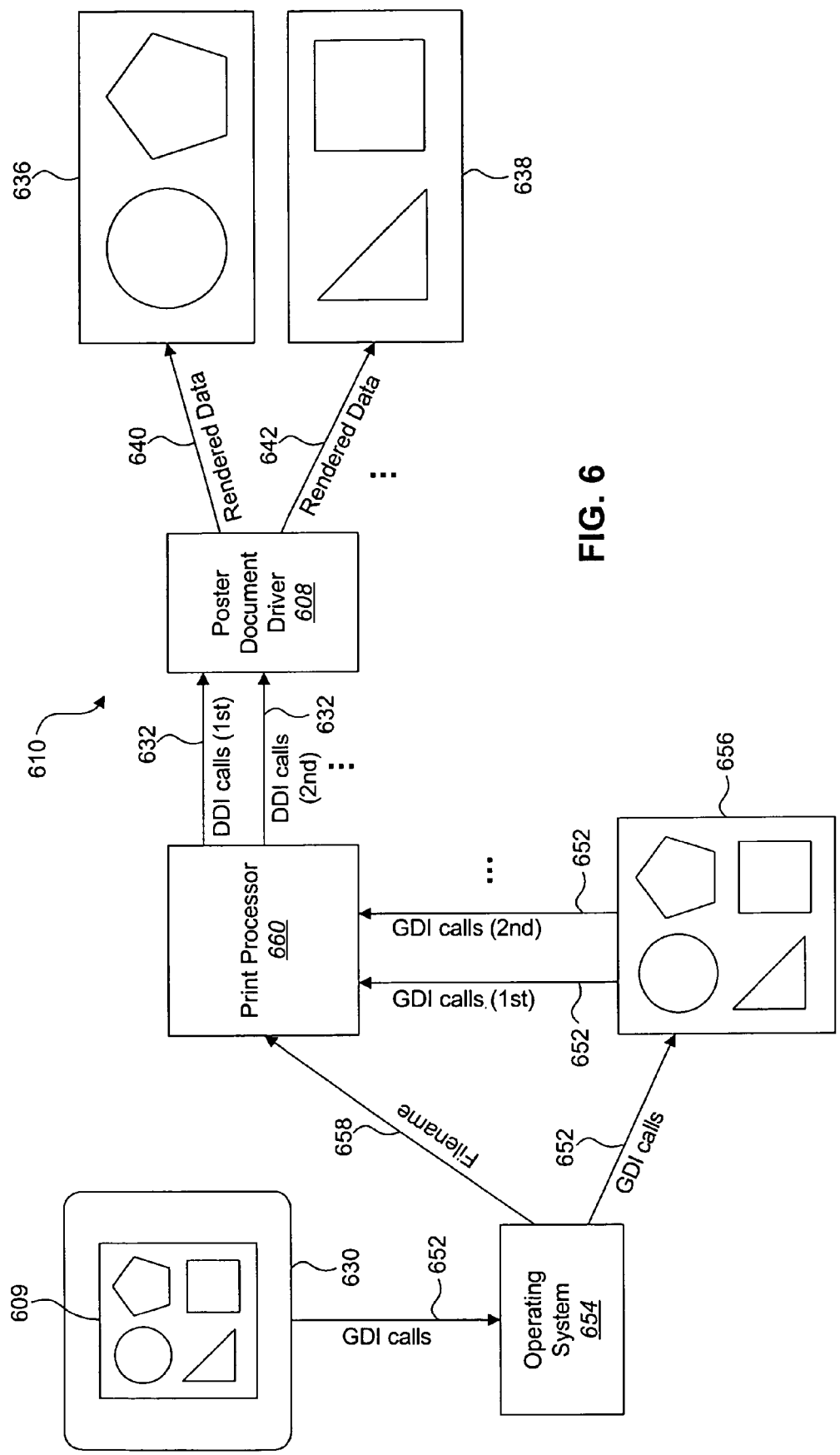
FIG. 6 illustrates another exemplary way that a poster document driver may format a poster document for printing on a larger paper size.

FIG. 6 illustrates another exemplary way that a poster document driver 608 may format a poster document 610 for printing on a larger paper size. As before, a document 609 generated by a user is shown as it may appear on a computer monitor 630. In the illustrated embodiment, the application (not shown) that initiates printing of the document 609 makes a series of graphics device interface (GDI) calls 652 to the operating system 654. The operating system 654 saves the GDI calls 652 to an enhanced metafile (EMF) file 656. The operating system 654 also provides the filename 658 of the EMF file 656 to a print processor 660.

For each physical page that is used to print the resulting poster document 610, the driver 608 has the print processor 660 play back the EMF file 656. The GDI calls 652 in the EMF file 656 are converted to DDI calls 632 and provided to the driver 608. The driver 608 renders the DDI calls 632 that correspond to the current physical page, applying an appropriate offset and scale so that the current physical page of the poster document 610 prints correctly on the larger paper size.

More specifically, to effect printing of the first physical page 636 of the poster document 610, the driver 608 has the print processor 660 play back the EMF file 656 for the first time. The GDI calls 652 from the EMF file 656 are converted to DDI calls 632, which are provided to the driver 608. The driver 608 renders the DDI calls 632 that correspond to the first physical page 636 of the poster document 610, applying an appropriate offset and scale so that the content corresponding to the first physical page 636 of the poster document 610 prints correctly. The driver 608 ignores the DDI calls 632 corresponding to other physical pages of the poster document 610. The first set of rendered data 640 is sent to the printing device (not shown) and used to print the first physical page 636 of the poster document 610.

If the poster document 610 will occupy more than one physical page when printed on the larger paper size, the driver 608 effects printing of the second physical page 638 by having the print processor 660 play back the EMF file 656 for the second time. The GDI calls 652 from the EMF file 656 are converted to DDI calls 632, which are provided to the driver 608. The driver 608 renders the DDI calls 632 that correspond to the second physical page 638 of the poster document 610, applying an appropriate offset and scale so that the content corresponding to the second physical page 638 of the poster document 610 prints correctly. The driver 608 ignores the DDI calls 632 corresponding to other physical pages of the poster document 610. The second set of rendered data 642 is sent to the printing device (not shown) and used to print the second physical page 638 of the poster document 610. If the poster document 610 occupies more than two physical pages when printed, then the method described above in connection with the first and second physical pages 636, 638 may be repeated for each additional physical page.

The above discussion has focused on the functionality of the poster document driver 108 related to automatically minimizing the number of physical pages that are used to print a poster document. The poster document driver 108 may be able to implement other functionality related to the printing of poster documents. As indicated above, the poster document driver 108 may be configured to enlarge a single-page document into a poster document that is printed on multiple sheets of paper. Advantageously, the driver 108 may be configured to allow the user to select a paper size for the printed output that is non-symmetrical relative to the dimensions of the single-page document.

In accordance with how the term "non-symmetrical" is used herein, two different types of paper are non-symmetrical if their dimensions are other than equal or whole number increments of one another. For example, portrait-oriented letter-sized paper and landscape-oriented ledger-sized paper are symmetrical paper types because their heights are equal and the width of the landscape-oriented ledger-sized paper is two times the width of the portrait-oriented letter-sized paper. (The height of a portrait-oriented letter-sized page is 11 inches, while the height of a landscape-oriented ledger-sized page is also 11 inches. The width of a portrait-oriented letter-sized page is 8½ inches, while the width of a landscape-oriented ledger-sized page is 17 inches.) However, portrait-oriented letter-sized paper and portrait-oriented ledger-sized paper are non-symmetrical paper types because their heights and widths are not equal or whole number increments of one another. (The height of a portrait-oriented letter-sized page is 11 inches, while the height of a portrait-oriented ledger-sized page is 17 inches. The width of a portrait-oriented letter-sized page is 8½ inches, while the width of a portrait-oriented ledger-sized page is 11 inches.) Letter-sized paper and legal-sized paper are also non-symmetrical paper types, whether in the portrait or landscape orientation.

Figure 7:
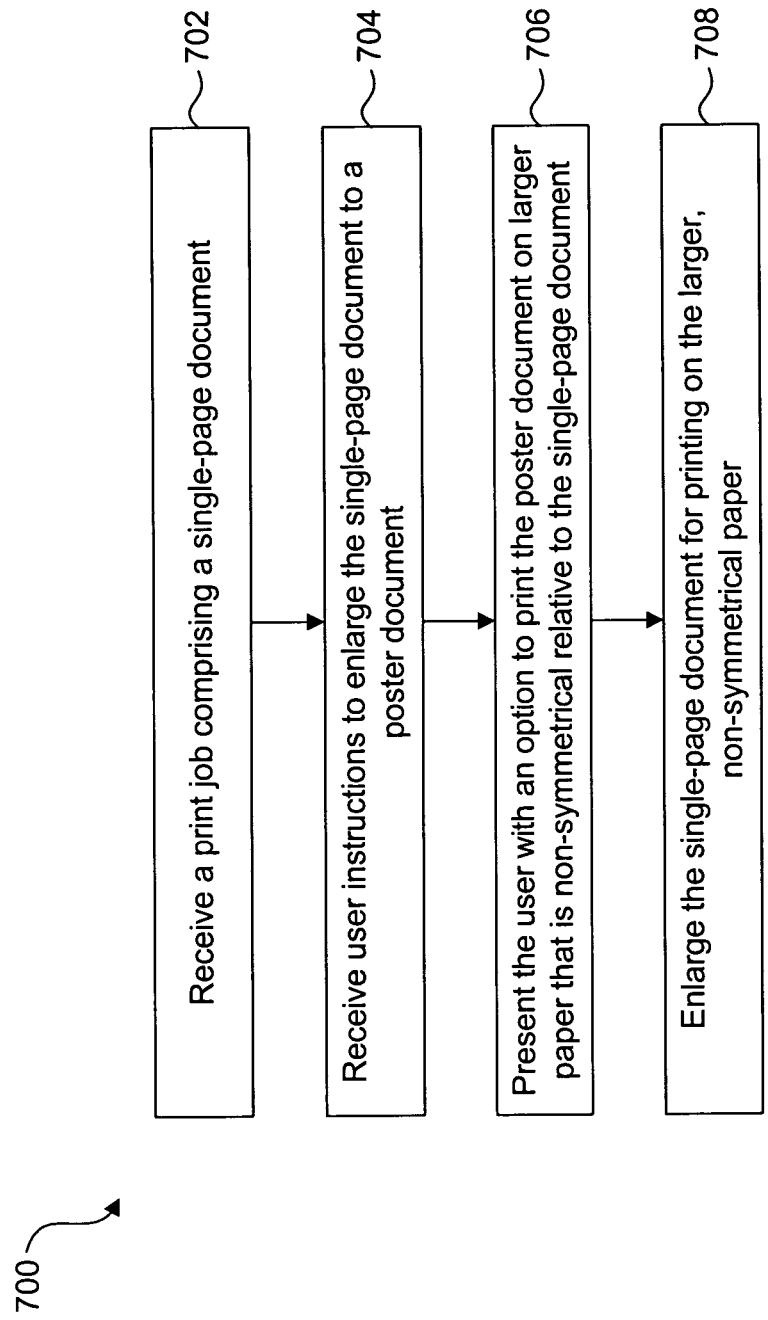
FIG. 7 illustrates an exemplary method that may be performed by a poster document driver in order to enlarge a single-page document to a poster document.

FIG. 7 illustrates an exemplary method 700 that may be performed by the poster document driver 108 in order to enlarge a single-page document to a poster document. The method 700 may be performed in response to a user of the computer system 102 initiating printing of a single-page document. The driver 108 receives 702 a print job comprising the single-page document. The driver 108 also receives 704 user instructions to enlarge the single-page document to a poster document.

The driver 108 presents 706 the user with an option to print the poster document on larger paper that is non-symmetrical relative to the dimensions of the single-page document. For example, if the single-page document is a letter-sized document, the driver 108 may indicate to the user that the poster document may be printed on legal-sized paper. If the user selects this option, the driver 108 enlarges 708 the single-page document for printing on the larger, non-symmetrical paper.

Figure 8B:
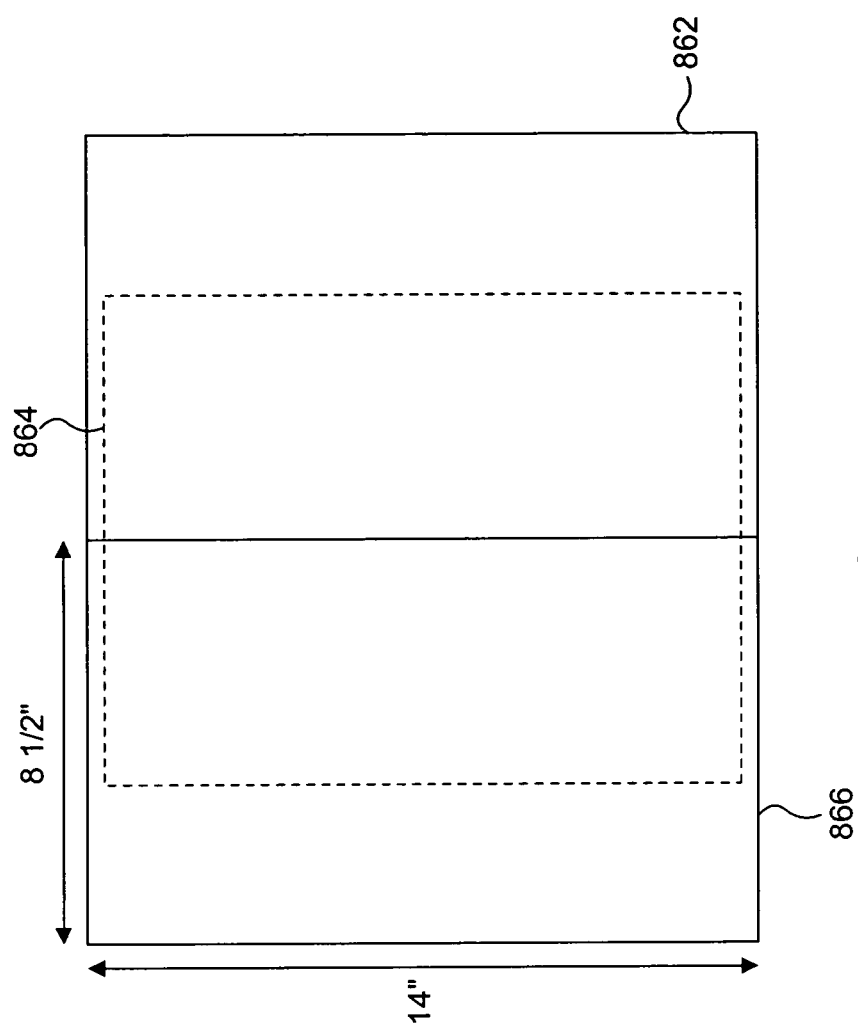
FIGS. 8A and 8B illustrate how an exemplary document may be formatted for printing both before and after being processed by a poster document driver.
Figure 8A:
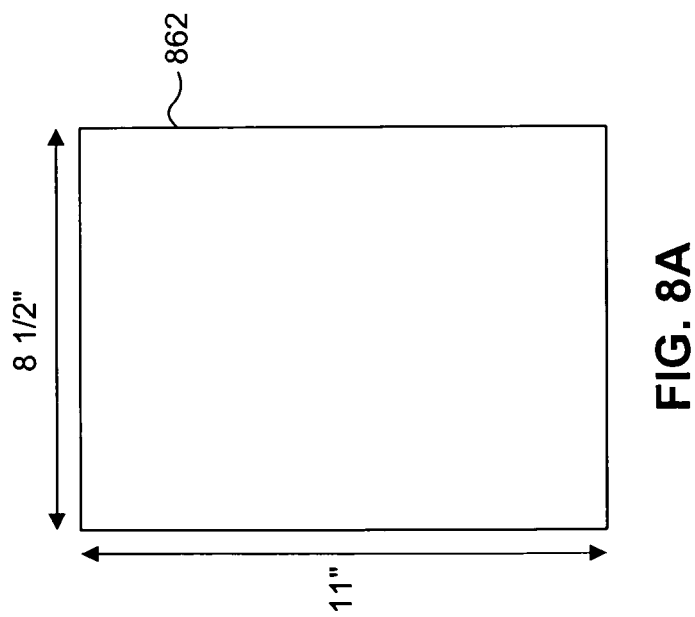

FIGS. 8A and 8B illustrate how an exemplary document may be formatted for printing both before and after being processed by a poster document driver 108. FIG. 8A shows a single-page document 862 before it is processed by the driver 108. The dimensions of the single-page document 862 are 8½"×11". FIG. 8B shows the single-page document 864 after it has been enlarged (i.e., the dimensions of the enlarged document 864 are greater than 8½"×11"). The enlarged document 864 is formatted for printing on two physical pages 866, 868 of legal-sized (8½"×14×) paper.

Some additional functionality that may be implemented by the poster document driver 108 will now be discussed. In some embodiments, the poster document driver 108 may be configured to allow a user to manually manipulate various characteristics of a poster document before the poster document is printed. The characteristics that may be manipulated include the paper on which the poster document is printed, the size of the poster document, the position of the poster document, and so forth.

Figure 9:
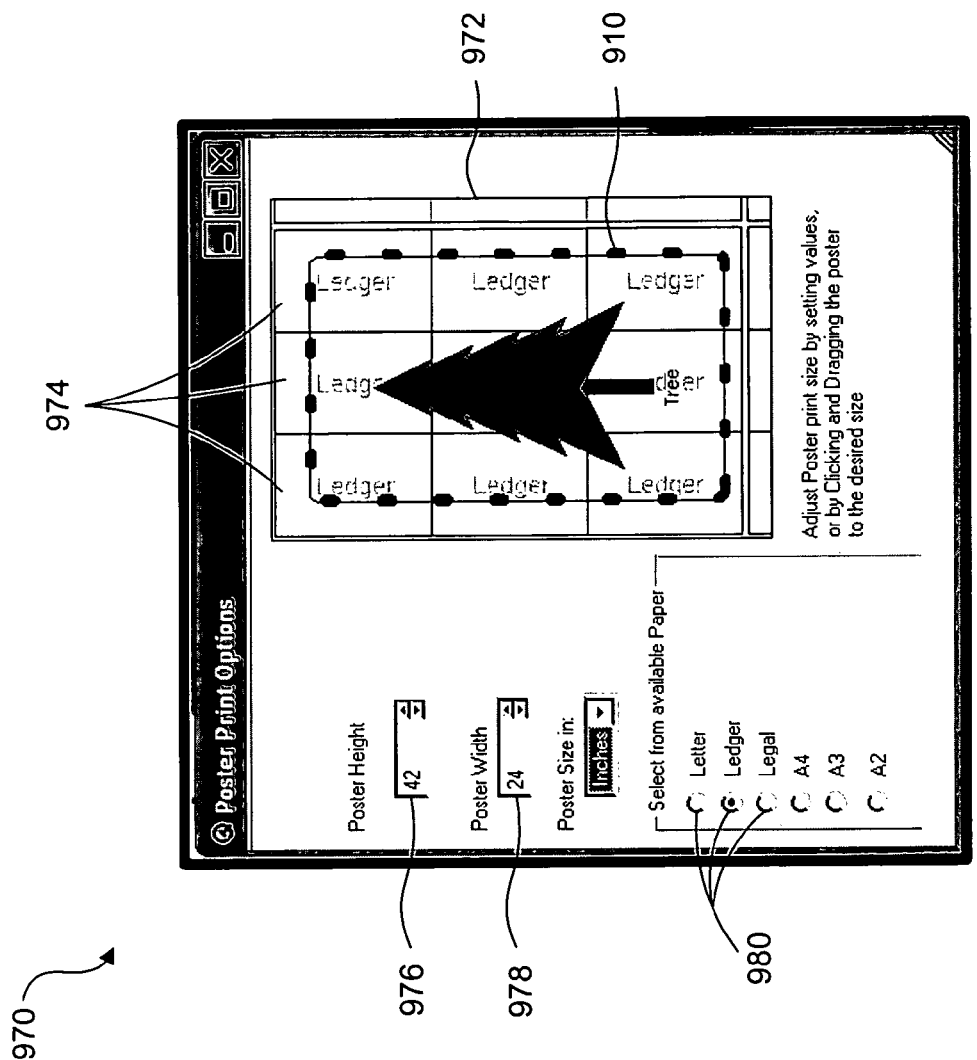
FIG. 9 illustrates an exemplary user interface window that may be displayed to a user in order to allow the user to manipulate characteristics of a poster document before printing.

FIG. 9 illustrates an exemplary user interface window 970 that may be displayed to a user in order to allow the user to manipulate characteristics of a poster document before printing. The user interface window 970 may be displayed in response to receiving a print job that comprises a document, and receiving a request to print the document as a poster document.

The user interface window 970 includes a preview area 972. A preview showing how the poster document 910 will appear when printed is displayed in the preview area 972. More specifically, the preview shows how the content of the poster document 910 is arranged on the physical pages 974 of the printed output.

The user interface window 970 includes one or more size adjustment controls that allow the user to resize the poster document. In particular, the user interface window 970 includes a height control 976 and a width control 978. The height control 976 allows the user to increase or decrease the height of the printed poster document 910. The width control 978 allows the user to increase or decrease the width of the printed poster document 910. If the user adjusts the size of the printed poster document 910 so that the number of physical pages changes, the number of physical pages shown in the preview area 972 may be updated accordingly. The user may also be allowed to reposition the content of the poster document 910 on the physical pages 974 of the printed output.

The user interface window 970 also includes one or more paper size controls that allow the user to change the size of the paper on which the poster document is printed. More specifically, the user interface window 970 includes a plurality of radio buttons 980. A separate radio button 980 is provided for each available paper size. The user may select a particular paper size by selecting the radio button 980 for that paper size. In some embodiments, the driver 108 determines the available paper sizes by querying the target printing device 104.

Figure 10:
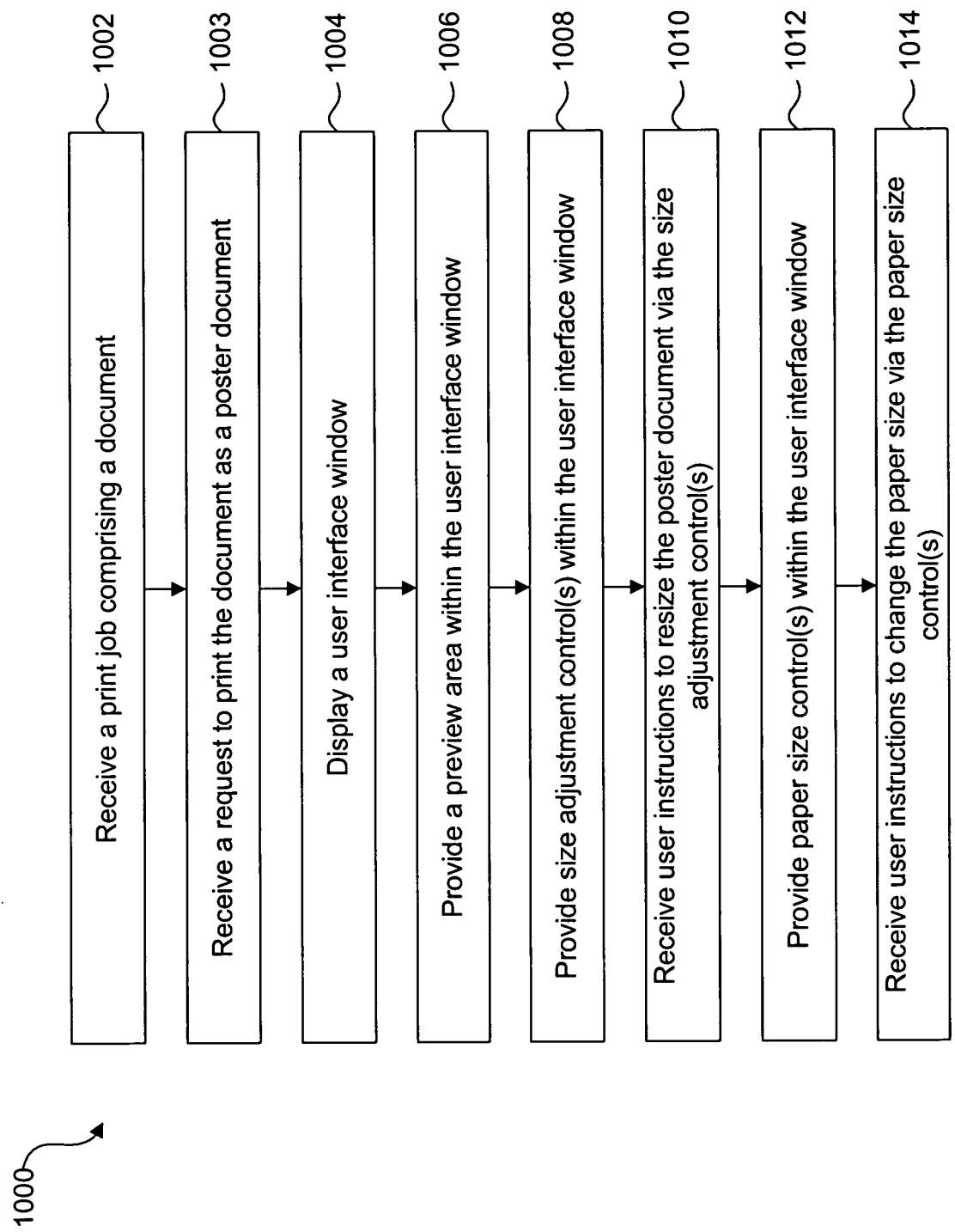
FIG. 10 illustrates a method that may be performed by a poster document driver in order to allow a user to manually manipulate various characteristics of a poster document before the poster document is printed.

FIG. 10 illustrates a method 1000 that may be performed by the poster document driver 108 in order to allow a user to manually manipulate various characteristics of a poster document before the poster document is printed. The method 1000 may be performed in response to a user of the computer system 102 initiating printing of a document, and the driver 108 being selected to facilitate printing of the document. The driver 108 receives 1002 a print job comprising the document. The driver 108 also receives 1003 a request to print the document as a poster document.

The driver 108 displays 1004 a user interface window 970. In some embodiments, the user interface window 970 may be displayed in response to the driver 108 receiving 1002 the print job and receiving 1003 the request to print the document as a poster document. The driver 108 provides 1006 a preview area 972 within the user interface window 970. The preview area 972 shows how the poster document will appear when printed.

The driver 108 also provides 1008 one or more size adjustment controls within the user interface window 970, such as the height control 976 and the width control 978 in the user interface window 970 shown in FIG. 9. The size adjustment controls allow the user to resize the poster document. Thus, the driver 108 may receive 1010 user instructions to resize the poster document via the size adjustment control(s).

The driver 108 also provides 1012 one or more paper size controls within the user interface window 970, such as the radio buttons 980 in the user interface window 970 shown in FIG. 9. The paper size controls allow the user to change the size of the paper on which the poster document is printed. Thus, the driver 108 may receive 1014 user instructions to change the paper size via the paper size control(s).

Figure 11:
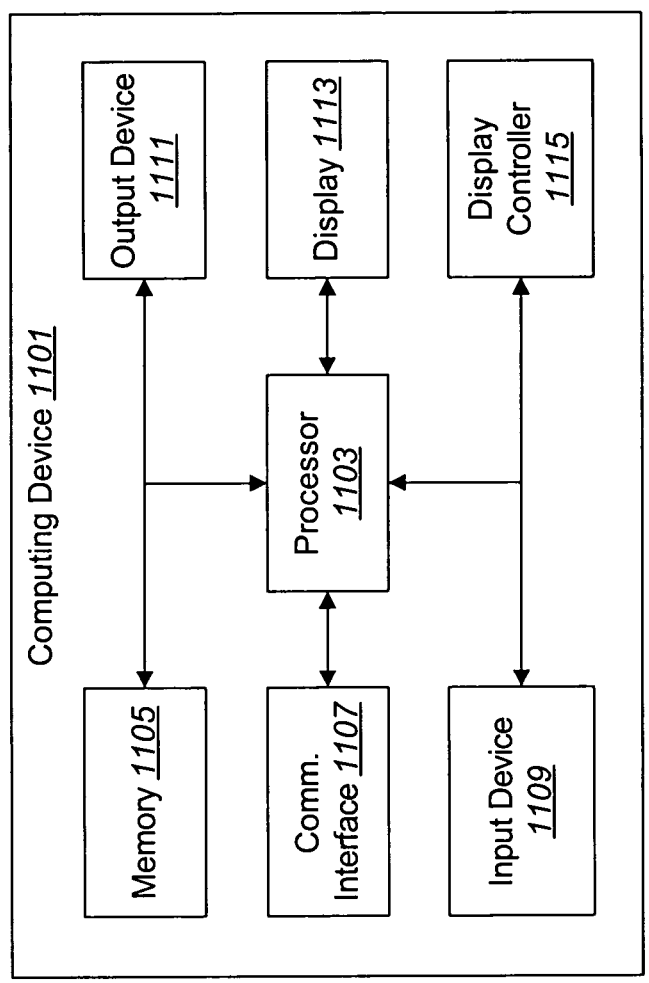
FIG. 11 is a block diagram illustrating the major hardware components typically utilized in a computer system.

FIG. 11 is a block diagram illustrating the major hardware components typically utilized in a computer system 1101. The illustrated components may be located within the same physical structure or in separate housings or structures.

The computer system 1101 includes a processor 1103 and memory 1105. The processor 1103 controls the operation of the computer system 1101 and may be embodied as a microprocessor, a microcontroller, a digital signal processor (DSP) or other device known in the art. The processor 1103 typically performs logical and arithmetic operations based on program instructions stored within the memory 1105.

As used herein, the term memory 1105 is broadly defined as any electronic component capable of storing electronic information, and may be embodied as read only memory (ROM), random access memory (RAM), magnetic disk storage media, optical storage media, flash memory devices in RAM, on-board memory included with the processor 1103, EPROM memory, EEPROM memory, registers, etc. The memory 1105 typically stores program instructions and other types of data. The program instructions may be executed by the processor 1103 to implement some or all of the methods disclosed herein.

The computer system 1101 typically also includes one or more communication interfaces 1107 for communicating with other electronic devices. The communication interfaces 1107 may be based on wired communication technology, wireless communication technology, or both. Examples of different types of communication interfaces 1107 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 1101 typically also includes one or more input devices 1109 and one or more output devices 1111. Examples of different kinds of input devices 1109 include a keyboard, mouse, microphone, remote control device, button, joystick, trackball, touchpad, lightpen, etc. Examples of different kinds of output devices 1111 include a speaker, printer, etc. One specific type of output device which is typically included in a computer system is a display device 1113. Display devices 1113 used with embodiments disclosed herein may utilize any suitable image projection technology, such as a cathode ray tube (CRT), liquid crystal display (LCD), light-emitting diode (LED), gas plasma, electroluminescence, or the like. A display controller 1115 may also be provided, for converting data stored in the memory 1105 into text, graphics, and/or moving images (as appropriate) shown on the display device 1113.

Of course, FIG. 11 illustrates only one possible configuration of a computer system 1101. Those skilled in the art will recognize that various other architectures and components may be utilized.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for minimizing how many physical pages are used to print a poster document, comprising:
   receiving, at a printer driver, a print job comprising a document;
   receiving, at the printer driver, a request to print the document as a poster document, wherein a logical page of the poster document has greater dimensions than a physical page on which the poster document is to be printed;

formatting, at the printer driver, the poster document for printing on an initial physical paper size, wherein the poster document requires more than one physical page for printing if the poster document is printed on paper having the initial physical paper size;

determining, at the printer driver, whether a physical paper size that is supported by a target printing device separate from the printer driver is larger than the initial physical paper size; and if, after a comparison by the printer driver of the initial physical paper size and the physical paper size that is supported by the target printing device, the physical paper size that is supported by the target printing device is larger than the initial physical paper size, and if formatting the poster document for printing on the larger paper size rather than the initial paper size reduces the number of physical pages required to print the poster document, and if it is determined that a user wants to print on the physical paper size that is supported by the target printing device rather than the initial physical paper size, then reformatting, by the printer driver, the poster document for printing on the larger physical paper size, wherein the reformatting of the poster document for printing on the larger physical paper size occurs after the printer driver receives the print job.

2. The method of claim 1, wherein the steps of formatting the poster document for printing on an initial physical paper size and determining whether the physical paper size that is supported by the target printing device is larger than the initial physical paper size are performed automatically in response to receiving the print job.

3. The method of claim 1, wherein determining whether the user wants to print the poster document on the larger physical paper size comprises displaying a user interface object.

4. The method of claim 1, wherein determining whether the user wants to print the poster document on the larger physical paper size comprises querying a predefined setting.

5. The method of claim 1, wherein if the initial physical paper size is larger than the physical paper size that is supported by the target printing device, the method further comprises formatting the poster document for printing on the initial physical paper size.

6. The method of claim 1, wherein the target printing device is selected from the group consisting of a printer, a fax machine, a scanner, a multi-function peripheral, and a copier.

7. The method of claim 1, wherein the step of reformatting the poster document for printing on the larger physical paper size comprises:

receiving instructions for the print job;

writing the instructions to a journal file; and for each physical page that is used to print the poster document, reading the instructions that correspond to a current physical page from the journal file, rendering the instructions, and applying an offset and scale when rendering the instructions.

8. The method of claim 1, wherein the step of reformatting the poster document for printing on the larger physical paper size comprises:

receiving instructions for the print job;

converting the instructions into page description language commands;

writing the page description language commands to an output file; and for each physical page that is used to print the poster document, reading the page description language commands that correspond to a current physical page from the output file and applying an offset and scale to the page description language commands.

9. The method of claim 1, wherein the step of reformatting the poster document for printing on the larger physical paper size comprises, for each physical page that is used to print the poster document:

having a print processor play back an enhanced metafile file;

rendering instructions that correspond to a current physical page; and applying an offset and scale when rendering the instructions.

10. A computer system that is configured to implement a method for minimizing how many physical pages are used to print a poster document, the computer system comprising:

a processor;

memory in electronic communication with the processor;

instructions stored in the memory, the instructions being executable to:

receive, at a printer driver, a print job comprising a document;

receive, at the printer driver, a request to print the document as a poster document, wherein a logical page of the poster document has greater dimensions than a physical page on which the poster document is to be printed;

format, at the printer driver, the poster document for printing on an initial physical paper size, wherein the poster document requires more than one physical page for printing if the poster document is printed on paper having the initial physical paper size;

determine, at the printer driver, whether a physical paper size that is supported by a target printing device separate from the printer driver is larger than the initial physical paper size; and if, after a comparison by the printer driver of the initial physical paper size and the physical paper size that is supported by the target printing device, the physical paper size that is supported by the target printing device is larger than the initial physical paper size, and if formatting the poster document for printing on the larger paper size rather than the initial paper size reduces the number of physical pages required to print the poster document, and if it is determined that a user wants to print on the physical paper size that is supported by the target printing device rather than the initial physical paper size, then reformat, by the printer driver, the poster document for printing on the larger physical paper size, wherein the reformatting of the poster document for printing on the larger physical paper size occurs after the printer driver receives the print job.

11. The computer system of claim 10, wherein the operations of formatting the poster document for printing on an initial physical paper size and determining whether the physical paper size that is supported by the target printing device is larger than the initial physical paper size are performed automatically in response to receiving the print job.

12. The computer system of claim 10, wherein if the initial physical paper size is larger than the physical paper size that is supported by the target printing device, the instructions are further executable to format the poster document for printing on the initial physical paper size.

13. A non-transitory computer-readable medium comprising executable instructions for minimizing how many physical pages are used to print a poster document, the executable instructions being executable to:

receive, at a printer driver, a print job comprising a document;

receive, at the printer driver, a request to print the document as a poster document, wherein a logical page of the poster document has greater dimensions than a physical page on which the poster document is to be printed;

format, at the printer driver, the poster document for printing on an initial physical paper size;

determine, at the printer driver, whether a physical paper size that is supported by a target printing device separate from the printer driver is larger than the initial physical paper size; and if, after a comparison by the printer driver of the initial physical paper size and the physical paper size that is supported by the target printing device, the physical paper size that is supported by the target printing device is larger than the initial physical paper size, and if formatting the poster document for printing on the larger paper size rather than the initial paper size reduces the number of physical pages required to print the poster document, and if it is determined that a user wants to print on the physical paper size that is supported by the target printing device rather than the initial physical paper size, then reformat, the poster document for printing on the larger physical paper size, wherein the formatting of the poster document for printing on the larger physical paper size occurs after the printer driver receives the print job.

14. The computer-readable medium of claim 13, wherein the operations of formatting the poster document for printing on an initial physical paper size and determining whether the physical paper size that is supported by the target printing device is larger than the initial physical paper size are performed automatically in response to receiving the print job.

15. The computer-readable medium of claim 13, wherein if the initial physical paper size is larger than the physical paper size that is supported by the target printing device, the instructions are further executable to format the poster document for printing on the initial physical paper size.

16. A method for enlarging a single-page document to a poster document, comprising:

receiving, at a print driver that is separate from a printing device, a print job comprising the single-page document;

receiving, at the print driver, instructions from a user to enlarge the single-page document to a poster document, wherein a logical page of the poster document has greater dimensions than a physical page on which the poster document is to be printed;

formatting, at the print driver, the poster document for printing on an initial physical paper size;

determining, after a comparison of the initial physical paper size and the physical paper size that is supported by a target printing device separate from the print driver at the print driver, whether a physical paper size that is supported by the target printing device is larger than the initial physical paper size;

determining that formatting the poster document for printing on the larger paper size rather than the initial paper size reduces the number of physical pages required to print the poster document;

determining whether a user wants to print on the larger physical paper size rather than the initial physical paper size;

presenting, by the print driver, the user with an option to print the poster document on paper that is larger and non-symmetrical relative to the dimensions of the single-page document; and if the user selects the option, enlarging, by the print driver, the single-page document for printing on multiple sheets of the larger, non-symmetrical paper, wherein the larger, non-symmetrical paper has dimensions that are other than equal or whole number increments of the dimensions of the single-page document.

17. A method for allowing a user to manually manipulate characteristics of a poster document before printing, comprising:

receiving a print job comprising a document;

receiving a request to print the document as a poster document, wherein a logical page of the poster document has greater dimensions than a physical page on which the poster document is to be printed;

formatting the poster document for printing on an initial physical paper size, wherein the poster document requires more than one physical page for printing if the poster document is printed on paper having the initial physical paper size;

displaying a user interface window;

providing a preview area within the user interface window, the preview area showing how the poster document will appear when printed;

providing size adjustment controls within the user interface window, wherein:
  the size adjustment controls allow the user to resize the poster document,
  the size adjustment controls comprise a height control that adjusts the height of the poster document and a width control that adjusts the width of the poster document,
  the height and width controls are separate controls that are individually adjustable and allow a user to enter a first numeric value for the height and a second numeric value for the width, and
  the size adjustment controls further allow the user to resize the poster document by clicking and dragging in the preview area;

providing controls within the user interface window to allow the user to manipulate the position of the poster document;

providing at least one paper size control within the user interface window, wherein, upon comparison of an initial physical paper size and a physical paper size supported by a target printing device, the physical paper size that is supported by the target printing device is larger than the initial physical paper size, and if formatting the poster document for printing on the larger paper size rather than the initial paper size reduces the number of physical pages required to print the poster document, and if it is determined that a user wants to print the poster document on the larger physical paper size, the at least one paper size control allows the user to change a paper size for which the poster document is formatted for printing; and updating the preview area responsive to user adjustment of the paper size control, the position manipulation controls, or the size adjustment controls.

18. The method of claim 17, further comprising receiving user instructions to resize the poster document via the size adjustment controls.

19. The method of claim 17, further comprising receiving user instructions to change the paper size via the at least one paper size control.

20. The method of claim 17, further comprising receiving user instructions to manipulate the position of the poster document via the position manipulation controls.

21. The method of claim 17,
   wherein determining whether the user wants to print the poster document on the larger physical paper size comprises displaying a user interface object.

22. The method of claim 21, wherein if it is determined that the user wants to print the poster document on the larger physical paper size, the method further comprising:
   reformatting the poster document for printing on the larger physical paper size.

\* \* \* \* \*